Nov. 26, 1957  M. J. UDY  2,814,658
ELECTRIC FURNACE
Filed Feb. 15, 1954  3 Sheets-Sheet 1

INVENTOR.
Marvin J. Udy
BY Gray, Mase
Wildermuth & Dunson
ATTORNEYS.

Nov. 26, 1957  M. J. UDY  2,814,658
ELECTRIC FURNACE
Filed Feb. 15, 1954  3 Sheets-Sheet 2

INVENTOR.
Marvin J. Udy
BY Gray, Mase
Wildermuth & Dunson
ATTORNEYS.

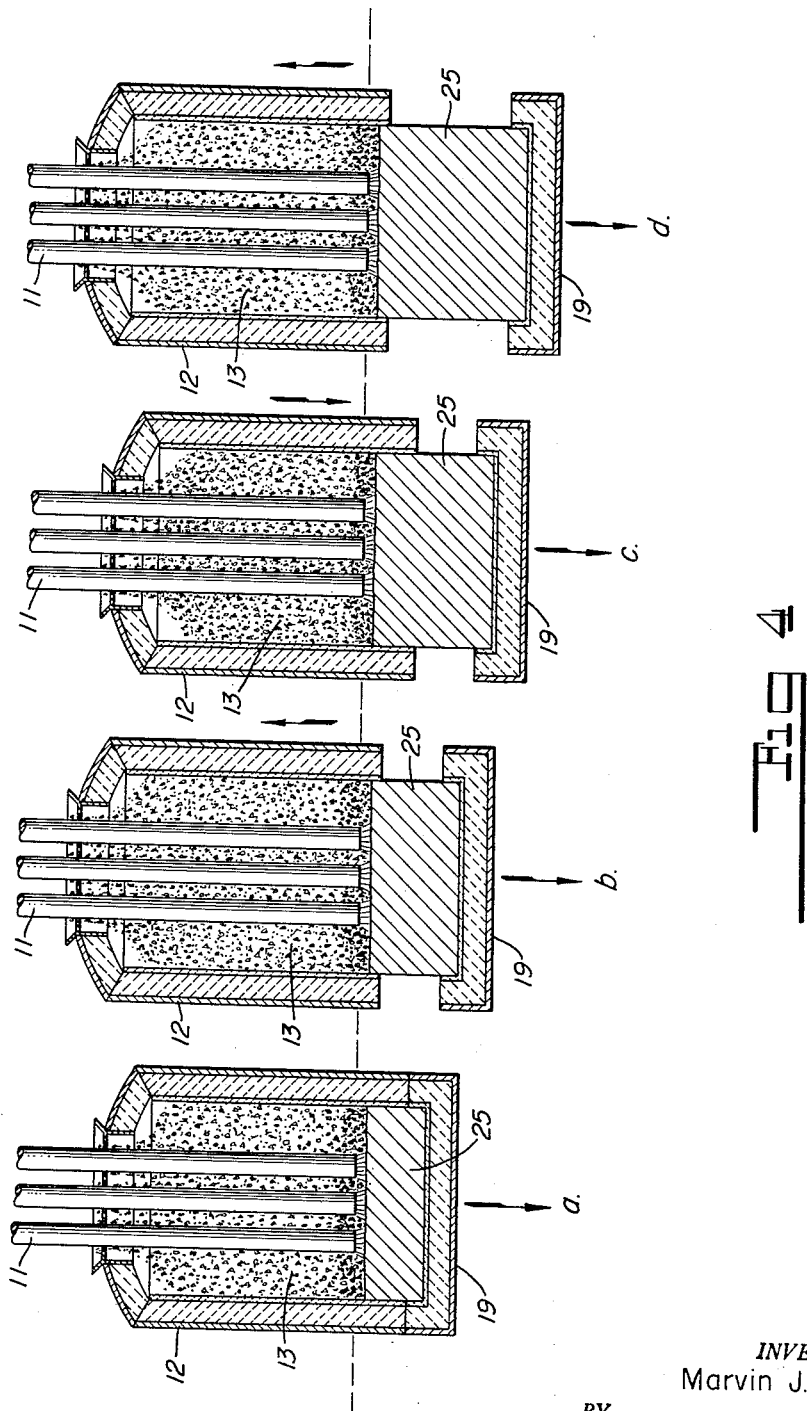

United States Patent Office 2,814,658
Patented Nov. 26, 1957

2,814,658
ELECTRIC FURNACE

Marvin J. Udy, Niagara Falls, N. Y., assignor to Strategic-Udy Metallurgical & Chemical Processes, Hamilton, Ontario, Canada, a corporation of Ontario, Canada Application February 15, 1954, Serial No. 410,131

1 Claim. (Cl. 13—33)

The present invention relates to an improved submerged-arc, or smothered-arc, type electric furnace. More particularly, the present invention relates to an apparatus for the production of calcium carbide and other compounds of carbon, calcium silicide and other binary compounds of silicon, silicon metal, compounds of titanium, and other similar materials.

There is disclosed and claimed in a copending application, Serial No. 387,588, an improved process and electric furnaces of the submerged-arc, or smothered-arc, type for the production of calcium carbide, etc. Furnaces constructed in accordance with the invention described in the aforementioned copending application, incorporate a furnace vessel which is moved continuously in a direction away from a plurality of electrodes so as to cause the reaction product formed in the reaction zones beneath the electrodes, to cool and solidify while in a state of high purity. In operation, furnaces of this construction have been satisfactory. However, where building area or plant space available is a critical factor in the design of the furnace installation, and where it is necessary for economic reasons to recover all of the gaseous products from the reaction, then furnaces constructed in accordance with the present invention are more satisfactory.

The electric furnaces used most widely for the present day production of calcium carbide, for example, are of the tapping type. The reaction products are tapped at intervals through a tapping hole and run into chills or molds where the molten reaction product is solidified by cooling.

Prior to the adoption of the tapping furnace, ingot type furnaces were used for the production of calcium carbide. The original ingot furnace was a steel box lined with carbon bricks. Using single-phase power, an arc was sprung between a single electrode mounted vertically above the box and the hearth electrode, which was the bottom lining. During the run, the single, vertically mounted electrode was raised manually as the reaction product was formed in the area beneath the electrode.

The original ingot furnaces are now considered obsolete. Their operation had a very low-energy efficiency, a high consumption of raw materials, high labor costs, and a low-production output.

The Horry rotary type furnace was the next development, and was intended to overcome the inherent disadvantages of the original ingot furnace. However, the Horry furnace was limited to the use of single-phase power and had a low-energy efficiency, together with a high consumption of raw materials, high labor costs, and a low-production output.

The present-day tapping furnace using three-phase power is operated at a comparatively high-energy efficiency and is producing large quantities of calcium carbide at relatively low cost. However, even with the most efficient tapping furnace, it has never been found practical to produce a grade of calcium carbide higher than 85 percent. 85 percent calcium carbide will yield about 4.7 cubic feet of acetylene per pound of carbide. This yield drops to more nearly 4.6 cubic feet by the time the calcium carbide is made ready for shipment to the consumer. The U. S. standard for large sizes of calcium carbide is 4.5 cubic feet of acetylene per pound of carbide, minimum.

One hundred percent pure calcium carbide should yield approximately 5.9 cubic feet of acetylene per pound of carbide. If 100 percent purity is reached, it means 1.2 cubic feet more acetylene per pound of carbide, or 25 percent more than from the same amount of carbide being now produced commercially. Theoretically, pure calcium carbide would require 100 percent pure lime and pure carbon. Materials are available in the purities that approach this value, and it should be possible by the practice of this invention to produce calcium carbide that will yield at least 5.6 cubic feet of acetylene, or 19 percent more acetylene than from the average grade of calcium carbide being produced commercially, and 24 percent more than that specified as the U. S. standard, minimum.

In the operation of a tapping furnace, a certain amount of the power input is consumed to make up the heat loss into the unreacted raw material and through the walls of the furnace. Still more of the power input is required to maintain the reaction product in a molten state so that the furnace will not "freeze" and become impossible to tap. The melting point of calcium carbide rises sharply as nearer 100 percent purity is reached. Pure calcium carbide has a melting point of approximately 2300° C., so that the tapping of a calcium carbide more pure than 85 percent, becomes economically prohibitive.

Therefore, since a tapping furnace cannot be economically operated at a temperature higher than that at which 85 percent pure calcium carbide can be kept in the molten state so as to permit tapping, the carbon balance in relation to temperature and lime content becomes extremely critical. If carbon-containing materials (carbon, coke, charcoal, coal, etc.) are present in excess of the amount of carbon required stoichiometrically for the production of 85 percent pure carbide, the excess carbon causes an increase in conductivity of the charged raw materials, making it impossible to maintain the electrode position as well as increasing the purity of the carbide toward 100 percent, which makes tapping impossible and may even cause total freezing of the carbide in the bottom of the furnace.

To reduce this amount of excess carbon at any given temperature, it is necessary either to increase the operating temperature of the furnace nearer to the melting point of pure calcium carbide (2300° C.) or else to add large quantities of calcium-containing materials, such as free lime, at regular intervals, until the carbon returns to the normal operating amount. If free lime is required to be added, the quality of the carbide varies over a wide range and the product has little uniformity.

The tapping furnace also presents severe difficulties in that the addition of free lime to an operating furnace results in fuming and dusting with a resultant increase in consumption of raw materials and contamination of the area surrounding the furnace installations.

Therefore, it is an object of this invention to provide an improved furnace of the submerged-arc, or smothered-arc, type for the production of calcium carbide and other products, which is constructed to operate in a vertical position without requiring an unduly large floor area.

Further, it is an object of this invention to provide a furnace for the continuous production of calcium carbide, etc. which will recover virtually all of the gaseous products of the reaction taking place in the reaction zone beneath the electrodes.

Further, it is an object of this invention to provide an improved furnace for the production of calcium carbide and other products, the construction of which; does not require the use of chills or molds; results in a high-energy efficiency in that the power input is primarily consumed to perform a chemical reaction and not to maintain the product of the reaction at a temperature above its melting point so as to permit its removal from the furnace in a molten state; and will utilize a power input of at least 50 kw. per cubic foot of raw materials, and preferably will be operated with the power input of at least 100 kw. per cubic foot of raw materials.

Still further, it is an object of this invention to provide an improved furnace for the production of calcium carbide, the operation of which will produce calcium carbide that will give a substantially higher gas yield than the calcium carbide produced commercially in the present day tapping furnace, and in which operation the presence of excess carbon is not critical.

Other objects and advantages of this invention will be apparent in view of the following detailed disclosure and description thereof.

In the practice of this invention, the furnace utilizes three-phase power through a plurality of electrodes having axes parallel to the axis of the furnace vessel. Automatic electrode regulators are set to maintain the electrodes in constant, or substantially fixed positions, relative to the upper surface or limit of the reaction zone in the arc of the electrodes. When an increase or decrease in the temperature of the reaction zone is desired, the voltage to the electrodes is increased or decreased and the electrodes are adjusted to maintain the proper relative position or depth between the electrode tips and the upper surface of the reaction zones.

When the furnace is being operated, the furnace vessel is moved continuously in a reciprocating manner, that is, the entire vessel is moved along its own axis; first away from the electrodes, and then after a determinable length of time, toward the electrodes. The reciprocating movement is for the purpose of preventing the ingot of the reaction product from adhering to the inner lining of the furnace vessel.

The furnace vessel is constructed with a separable or removable bottom plate. The reaction product is formed atop the bottom plate which is continuously lowered by suitable mechanical means in a direction away from the substantially fixed position of the electrodes once the furnace has been put under power. Thus, there are two distinct movements in the design of this furnace: the furnace vessel which reciprocates, alternately, away from the electrode and toward the electrodes; and the continuous movement of the bottom plate supporting the ingot of reaction product in a direction away from the electrodes.

Fig. 4 shows a continuous formation of an ingot in a furnace embodying the invention.

Figure 1:
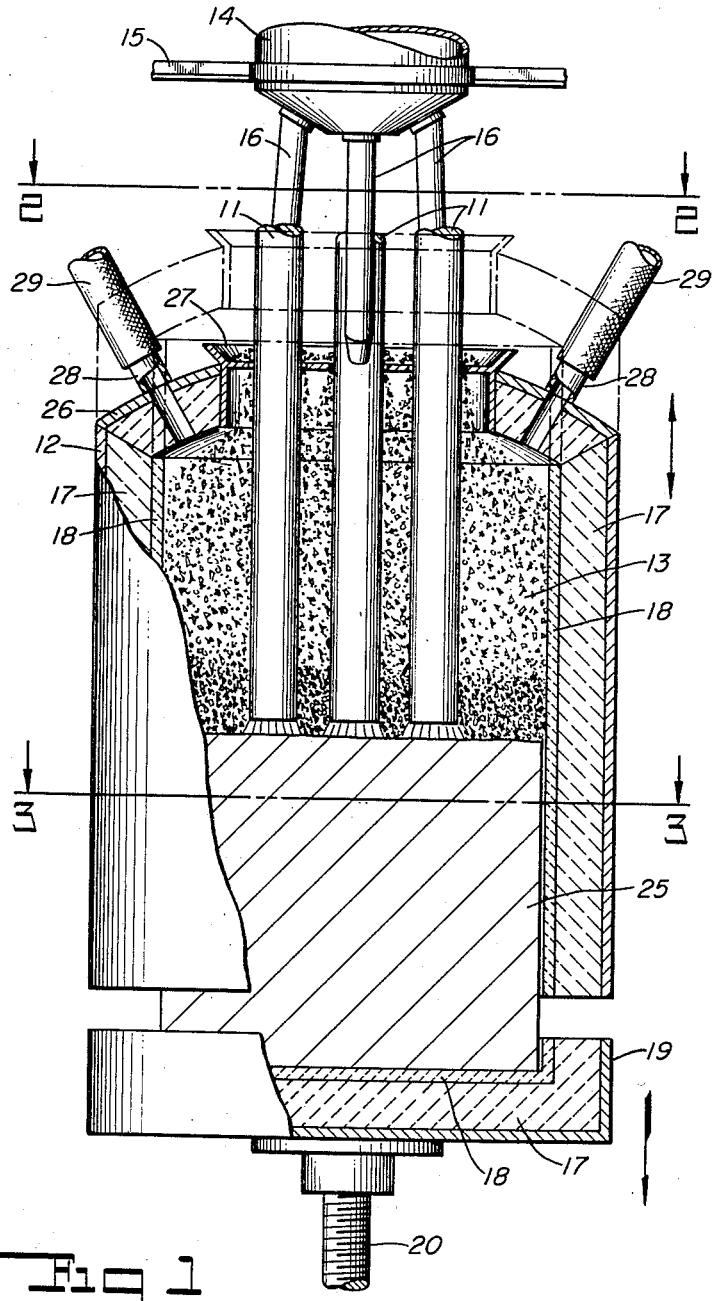
Fig. 1 is an elevational sectional view of a furnace embodying the invention.
Figure 2:
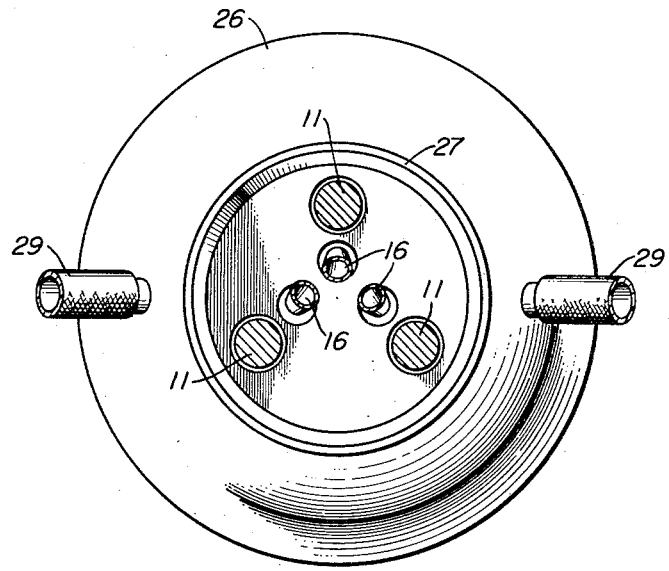
Fig. 2 is a sectional top view of line 2—2 of Fig. 1.
Figure 3:
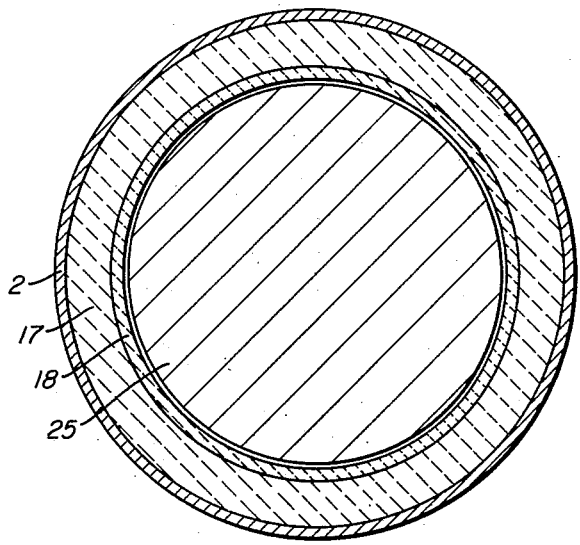
Fig. 3 is a sectional view on line 3—3 of Fig. 1.

In the furnace, as shown in Fig. 1, electrodes 11 are placed in delta shape and so spaced that the reaction zones around each electrode merge with one another so as to form a single reaction zone containing the reaction product. The furnace vessel 12 which may be generally cylindrical in shape alternately moves away from the electrodes 11 and then toward the electrodes by suitable mechanical means. The charge raw materials 13 are charged from a water-cooled hopper 14, supported by structure 15, through tubes 16. The inner wall of the furnace vessel 12 is lined with an insulating material 17, which is, in turn, faced with carbon brick 18.

A movable bottom plate 19 conforming generally to the shape of the furnace vessel 12, supports the ingot of reaction product 25 formed in the reaction zone of the electrodes 11. The bottom plate 19 may be lined with an insulating material 17 and faced with carbon brick 18. Affixed to the movable bottom plate is a screw 20 which is withdrawn into a mechanism (not shown), or lowered by other suitable means, so as to lower the bottom plate away from the electrodes 11. The ingot of reaction product cools and begins to solidify while still within the furnace vessel 12. Though the furnace vessel 12 is being reciprocated continuously, this movement does not affect the continual downward movement of the ingot 25 atop bottom plate 19. In fact, the reciprocating movement of the furnace vessel insures that the ingot 25 will not adhere to the carbon brick lining 18 of the furnace vessel, and so will freely move downward with the movement of bottom plate 19 by means of a suitable lowering means 20.

The furnace vessel 12 has a metal cover shell 26 conforming generally to the shape of the furnace vessel and affixed thereto so as to form a gas-tight seal along the outer radius thereof having a charge raw material funnel 27, which is lined with a supporting structure 15, preferably formed of an insulating material. The gases formed by the reaction are removed from beneath the cover through gas outlet pipes 28 and flexible conduits 29 to a gas scrubber (not shown) which cleans the gases so as to permit utilization of their combustion value. The exhaustion of the gases from beneath the cover is controlled by valves (not shown) so as to maintain a positive pressure in the furnace of one-eighth to one-quarter inch. The small amount of gas escaping around the electrodes 11 is allowed to burn as a safety and as a visual indication to the operator as to whether the furnace is under pressure.

Fig. 4 shows a continuous operation of the furnace. Fig. 4a shows the furnace vessel with the bottom plate immediately beneath the furnace vessel. An ingot of reaction product, supported by the bottom plate, has been formed beneath the electrodes. Fig. 4b shows that the electrodes have remained virtually stationary with relation to their distance from the ingot top surface, while the bottom plate and ingot have moved downward, and the furnace vessel has reciprocated upward. Fig. 4c shows that the height of the ingot has increased while the bottom plate has moved still further downward, the furnace vessel has reciprocated downward, while the distance between the electrodes and the ingot surface has remained virtually constant. Fig. 4d shows a still larger ingot as having been formed while the furnace vessel is reciprocating, the bottom plate has continually moved downward and the distance between the electrodes has remained virtually the same throughout the entire "run" of the furnace.

The furnace described herein can be used to produce calcium silicide, ferrocarbo titanium, titanium carbide, silicon carbide, aluminum carbide, fused aluminum oxide, silicon metal, and other similar materials.

As used herein, carbides may be defined as binary compounds of carbon with a more positive element. Silicides may be defined as binary compounds of silicon with an element or radical.

An advantage of this invention is that the reaction product does cool and solidify immediately after leaving the reaction zone beneath the electrodes. Thus, the use of chills or molds is not required, and a lower operating temperature may be used if desired.

Still another advantage is that the input of three-phase power is principally used to produce the reaction product and is not used to maintain the reaction product at a temperature above its melting point.

Still another advantage is that a reaction product of high purity is produced because a high temperature may be maintained in the reaction zone. This high temperature permits the use of raw materials of a high degree of purity, which results in the production of a correspondingly high-purity reaction product. Further, the movement of the ingot and bottom plate in a direction away from the electrodes causes the reaction product to cool and solidify while still in the state of high purity.

When the furnace of the present invention is used for the production of calcium carbide, the furnace may be charged with 100 percent of the carbon-containing materials required for the grade of calcium carbide desired, plus an excess. The presence of excess carbon insures complete reaction of the calcium and the calcium-containing materials to form calcium carbide of the desired grade, and results in an efficient consumption of raw materials and a substantial reduction in dust loss. The presence of excess carbon in the furnace is not detrimental or deleterious because the ingot and bottom plate are continuously moving away from the area beneath the electrodes and, thus, the excess carbon cannot accumulate and interfere with the electrode regulation and normal furnace operation.

As a corollary, free lime need not be added to reduce the excess carbon to a satisfactory operating balance. It is necessary to add only that amount of calcium-containing material as is required stoichiometrically to react with the theoretical amount of carbon present to produce calcium carbide of the desired degree of purity.

Still further, the use of this furnace permits the recovery of virtually all of the gaseous reaction products which may be utilized for their combustion values.

Lastly, a furnace constructed in accordance with this invention will not require an unduly large amount of floor space where plant area or floor space is critical in the design and installation of a furnace.

In the design and operation of any type of electric furnace, the single factor which is most important is the energy input per cubic foot of reactant material. The improved furnace, as herein described, will provide a very high energy input per cubic foot of reactant material and, thus, represents an important advancement of the art.

It is understood that the invention described and illustrated is not to be limited to the specific form or arrangement herein described and shown. It will be obvious to those skilled in the art that there are many modifications and variations of this improved furnace which are practical, yet still within the scope and range of this invention, and it is intended that these should be included.

What is claimed is:

An electric furnace comprising a vertical cylindrical vessel reciprocable along its axis, a plurality of vertically extending electrodes, a plurality of reagent feed conduits each positioned adjacent an electrode, means for maintaining said electrodes and reagent feed conduits in substantially fixed position while said vessel is reciprocated, a cover affixed to said vessel in gas-tight relationship, at least one gas outlet pipe extending from said cover, said cover having a plurality of apertures permitting passage therethrough of said electrodes, reagent feed conduits, and gas outlet pipe, a bottom plate having an upstanding flange conforming to the shape of said vessel, and means for progressively moving said bottom plate and material carrier thereon in a direction parallel to the axis of said vessel.

References Cited in the file of this patent

UNITED STATES PATENTS

| Re. 11,511 | Willson | Oct. 22, 1895 |
| 656,156 | Horry | Aug. 14, 1900 |
| 664,334 | Morehead | Dec. 18, 1900 |
| 803,147 | Appleby | Oct. 31, 1905 |

FOREIGN PATENTS

| 8,019 | Norway | July 11, 1899 |